United States Patent [19]
Fletcher

[11] Patent Number: 6,006,641
[45] Date of Patent: Dec. 28, 1999

[54] POWER COPING MACHINE

[76] Inventor: Donald C. Fletcher, 930 Sherman, Evanston, Ill. 60202

[21] Appl. No.: 08/967,440

[22] Filed: Nov. 11, 1997

[51] Int. Cl.$^6$ ...................................................... B27B 9/02
[52] U.S. Cl. ............................. 83/471.3; 83/489; 83/565; 83/490
[58] Field of Search ................................... 83/471.3, 473, 83/477.2, 486.1, 489, 490, 565, 564, 471, 471.1, 471.2, 472, 477, 477.1, 483, 484, 485, 486, 487, 488, 662, 665, 698.41, 698.42, 698.51, 698.61, 698.71, 699.41, 699.61

[56] References Cited

U.S. PATENT DOCUMENTS

| | | | |
|---|---|---|---|
| 2,203,389 | 6/1940 | Kurtz | 83/789 |
| 3,739,679 | 6/1973 | Schwend | 83/789 |
| 3,884,121 | 5/1975 | Agius | 83/917 |
| 3,942,566 | 3/1976 | Schmidt | 83/413 |
| 3,958,472 | 5/1976 | Kabanov et al. | 83/565 |
| 4,014,235 | 3/1977 | Fukami | 83/565 |
| 4,353,399 | 10/1982 | Harris | 83/565 |
| 4,353,785 | 10/1982 | Inoue | 83/565 |
| 4,355,557 | 10/1982 | Mecsey | 83/565 |
| 4,495,845 | 1/1985 | Sherby | 83/565 |
| 4,517,870 | 5/1985 | Kopp | 83/76.3 |
| 4,817,581 | 4/1989 | Trentadue | 83/489 |
| 5,038,646 | 8/1991 | Suwitoadj | 83/565 |
| 5,363,732 | 11/1994 | Heasley | 83/565 |
| 5,421,228 | 6/1995 | Fukinuki | 83/490 |
| 5,564,322 | 10/1996 | Naldi | 83/467.1 |

*Primary Examiner*—Kenneth E. Peterson
*Assistant Examiner*—Gyounghyun Bae
*Attorney, Agent, or Firm*—Marshall, O'Toole, Gerstein, Murray & Borun

[57] ABSTRACT

In order to precisely form joints in the ends of adjoining molding pieces, a power coping machine includes a molding support surface, a cutting tool, and a cutting tool support. The molding support surface stably supports a piece of molding to be coped with the machine. The molding support surface has a forward edge over which an end of the piece of molding can be made to extend for coping thereof. The cutting tool has a longitudinal axis extending generally transversely of the forward edge of the molding support surface. The cutting tool comprises an electric motor having a shaft extending generally parallel to the forward edge for mounting and driving a circular cutting blade in a plane generally perpendicular to the forward edge. The cutting tool support is disposed in spaced relation to the forward edge of the molding support surface for supporting the cutting tool for controlled movement. The cutting tool support facilitates controlled movement of the cutting tool in a direction generally parallel to and perpendicular to the forward edge of the molding support surface. With this arrangement, the circumferential cutting edge of the circular cutting blade can be moved to cope the end of the piece of molding in a precise fashion to produce a well-fitting joint.

17 Claims, 4 Drawing Sheets

POWER COPING MACHINE

FIELD OF THE INVENTION

The present invention is generally directed to power tools for finishing carpenters and, more particular, a power coping machine for coping a molding end therewith.

BACKGROUND OF THE INVENTION

Over the years, a wide variety of different types of tools have been developed for use by finishing carpenters. These tools are oftentimes specifically directed for accomplishing a particular function that is required for a finishing carpenter to be able to work effectively and efficiently. More recently, there has been a focus on tools that are powered in order to facilitate the tasks that must be performed.

By way of example, U.S. Pat. No. 2,203,389 to Kurtz discloses an apparatus for cutting contours in a workpiece. This relatively simple apparatus was subsequently followed by U.S. Pat. No. 3,942,566 to Schmidt which discloses an apparatus for shaping a wooden workpiece according to a template configuration and U.S. Pat. No. 4,014,235 to Fukami which discloses an apparatus for bandsawing operations which has a profiling mechanism capable of automatically copying a model. Still more recently, U.S. Pat. No. 5,363,732 to Heasley discloses a coping apparatus which includes a circular saw.

More specifically, the Heasley '732 patent discloses a circular saw that is mounted on two sliding bases for freedom of movement in the "X" and "Y" directions. The coping apparatus of this patent also includes a support for a stylus used to control the positioning of the saw blade by traversing movement along the profile of a template. With this arrangement, the template is supported on a stationary base underlying a table on which the end portion of a molding to be coped is suitably supported.

More traditionally, a molding end portion has been manually coped by using a conventional coping saw. This is an extremely time consuming and difficult task to perform which requires significant experience and expertise and, even then, it is difficult at best to provide a truly precise fit between two pieces of molding that are to form a joint. Accordingly, the Heasley '732 patent represents one attempt to overcome the limitations of a conventional coping saw.

The present invention is directed to overcoming one or more of the foregoing problems and achieving one or more of the resulting objects.

SUMMARY OF THE INVENTION

It is therefore a principal object of the present invention to provide a power coping machine suitable for coping an end of a piece of molding therewith. It is also an object of the present invention to provide a power coping machine having a cutting tool supported for movement generally parallel and perpendicular to a forward edge of a molding support surface. It is a further object of the present invention to provide the perpendicular movement along a radius coinciding with a longitudinal axis of the cutting tool. It is yet another object of the present invention to provide a power tool cutting blade in which each cutting tip is formed to have a generally V-shaped profile.

Accordingly, the present invention is directed to a power coping machine comprising a molding support surface, a cutting tool, and cutting tool support means. The molding support surface stably supports a piece of molding to be coped with the machine. The molding support surface also has a forward edge over which an end of the piece of molding can be made to extend for coping thereof. The cutting tool has a longitudinal axis extending generally transversely of the forward edge of the molding support surface. The cutting tool comprises an electric motor having a shaft extending generally parallel to the forward edge of the molding support surface for mounting a circular cutting blade on the shaft such that a circumferential cutting edge thereof is disposed in generally spaced relation to the forward edge. The cutting tool uses the electric motor to drive the blade in a plane generally perpendicular to the forward edge of the molding support surface. The cutting tool support means is disposed in spaced relation to the forward edge of the molding support surface for supporting the cutting tool for controlled movement. The cutting tool support means accommodates controlled movement in a direction generally parallel to and generally perpendicular to the forward edge of the molding support surface. With this arrangement, the circumferential cutting edge of the circular cutting blade can easily be moved so as to precisely cope the end of the piece of molding.

In a highly preferred embodiment, the longitudinal axis of the cutting tool normally extends generally transversely of the forward edge of the molding support surface. It is also highly advantageous for the cutting tool support means to support the cutting tool in a manner permitting at least two degrees of controlled manual movement of the cutting tool, including axial movement along an axis normally extending generally perpendicular to the longitudinal axis of the cutting tool and generally parallel to but spaced from the forward edge of the molding support surface, and also including radial movement of the cutting tool along a radius generally coinciding with the longitudinal axis of the cutting tool in a direction generally perpendicular to and toward and away from the forward edge of the molding support surface. With these features, the circumferential cutting edge of the circular cutting blade can be moved at least in an axial direction and radially relative to the axial direction to cope the end of the piece of molding.

In a most highly advantageous embodiment, the cutting tool support means supports the cutting tool in a manner permitted three degrees of controlled manual movement of the cutting tool. It accomplishes this by accommodating axial movement and radial movement, as previously described above, and also accommodating pivoting movement of the circular cutting blade to position it at an acute or obtuse angle relative to the forward edge of the molding support surface. Thus, the circumferential cutting edge of the circular cutting blade can be moved axially, radially, or pivoted to change the angular orientation to cope the end of a piece of molding.

As for other details of the present invention, the cutting tool support means preferably includes a linear bearing assembly operatively associated with the cutting tool and a frame for the machine for accommodating movement of the cutting tool. The linear bearing assembly advantageously accommodates movement which is generally parallel and perpendicular to the forward edge of the molding support surface. Further, the machine preferably includes handle means associated with the cutting tool at a point remote from the cutting tool support means for manually controlling movement of the cutting tool relative to the forward edge of the molding support surface.

In addition, the cutting tool support means preferably includes means for adjusting the angle of the longitudinal axis of the cutting tool relative to the forward edge of the molding support surface such that the circular cutting blade can be driven at an acute or obtuse angle thereto. In this connection, the angle adjusting means advantageously comprises a pivotal support assembly including first and second plates joined by a fastener. The first plate is operatively associated with the cutting tool and the second plate is operatively associated with the linear bearing assembly whereas the fastener releasably secures the first and second plates in a selected position of angular adjustment about the fastener.

As for other details of the present invention, the molding support surface is preferably defined by a generally planar tabletop and the frame is preferably defined by at least a pair of legs integrally associated with the tabletop so as to support the tabletop in spaced relation to a machine supporting surface. More specifically, the generally planar tabletop is advantageously supported by the legs in a generally horizontal plane in vertically spaced relation to a machine supporting surface and the forward edge of the generally planar tabletop comprises a linear edge spaced above the machine supporting surface and above the cutting tool.

As for details of construction of the linear bearing assembly, it preferably includes a rod spanning the distance between the legs of the frame and being integrally associated with the legs of the frame such that the rode extends generally parallel to and is spaced below the forward edge of the molding support surface. Further, the linear bearing assembly includes a linear bearing spaced below the cutting tool and integrally associated with the cutting tool by means of a mounting yoke joined to a housing for the electric motor at an end of the cutting tool generally opposite the handle means and remote from the circular cutting blade.

In another respect, the present invention is directed to a power tool cutting blade comprising a circular body member and a circumferential cutting region on an outer periphery of the circular body member. A central aperture is provided in the circular body member and the circumferential cutting region has a plurality of circumferentially spaced teeth disposed about the outer periphery of the circular body member. Additionally, the teeth each include a cutting tip formed so as to have a generally V-shaped profile therein.

Other objects, advantages and features of the present invention will be appreciated from, a consideration of the following specification taken in conjunction with the accompanying drawings.

DETAILED DESCRIPTION OF THE PREFERRED EMBODIMENT

Figure 1:
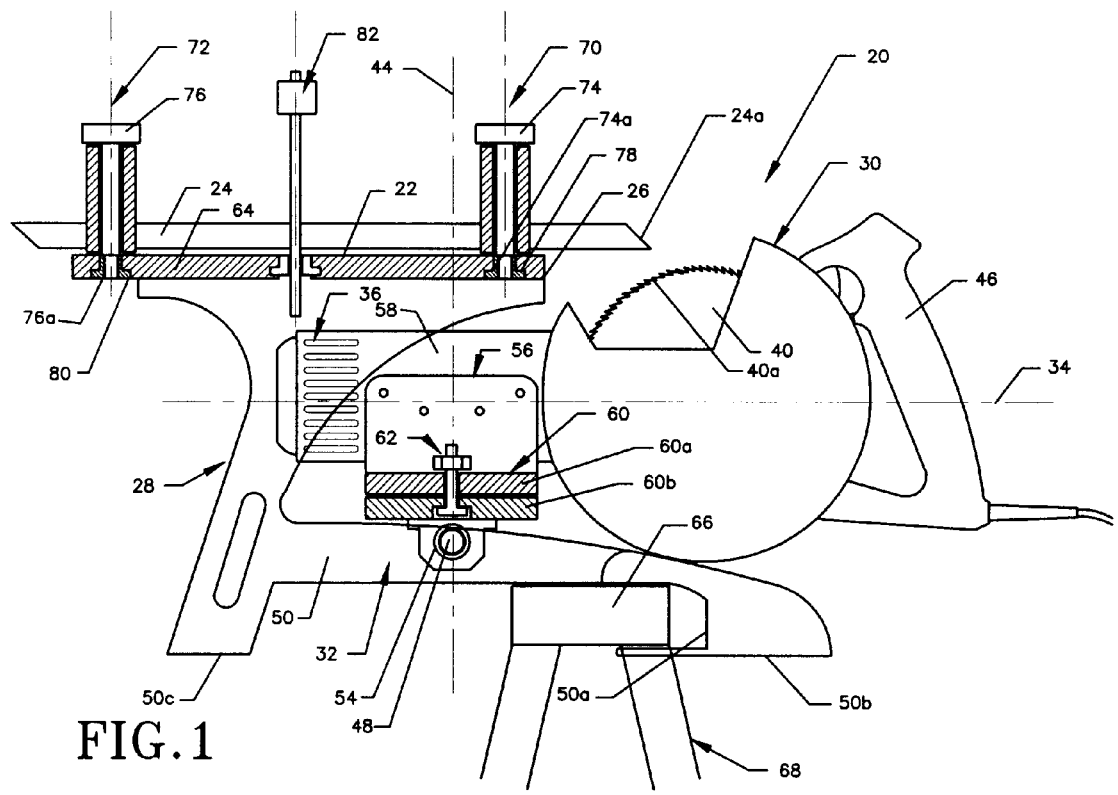
FIG. 1 is a left side elevational view of a power coping machine in accordance with the present invention.
Figure 2:
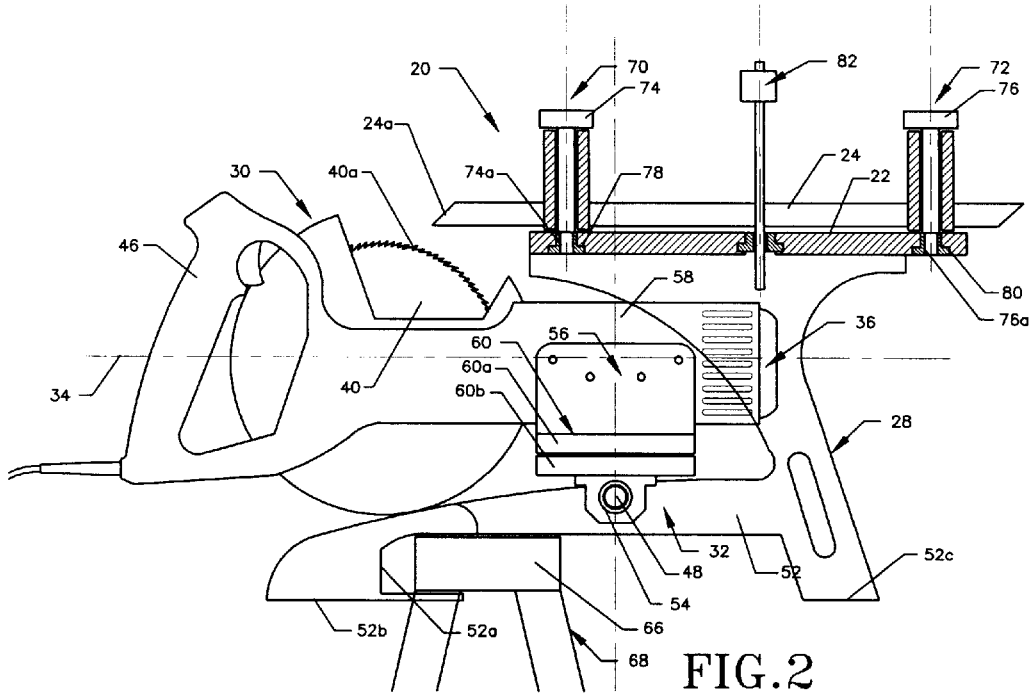
FIG. 2 is a right side elevational view of a power coping machine in accordance with the present invention.

In the illustrations given, and with reference first to FIG. 1, the reference numeral 20 designates generally a power coping machine in accordance with the present invention. The power coping machine includes a molding support surface 22 for stably supporting a piece of molding such as 24 to be coped with the machine 20. The molding support surface 22 has a forward edge as at 26 over which an end 24a of the piece of molding 24 can be made to extend for coping. The power coping machine 20 also includes a frame generally designated 28 with which the molding support surface 22 is integrally associated so as to be stably supported thereby. Still additionally, the power coping machine 20 includes a cutting tool generally designated 30 and cutting tool support means generally designated 32 described in detail hereinafter.

Figure 4:
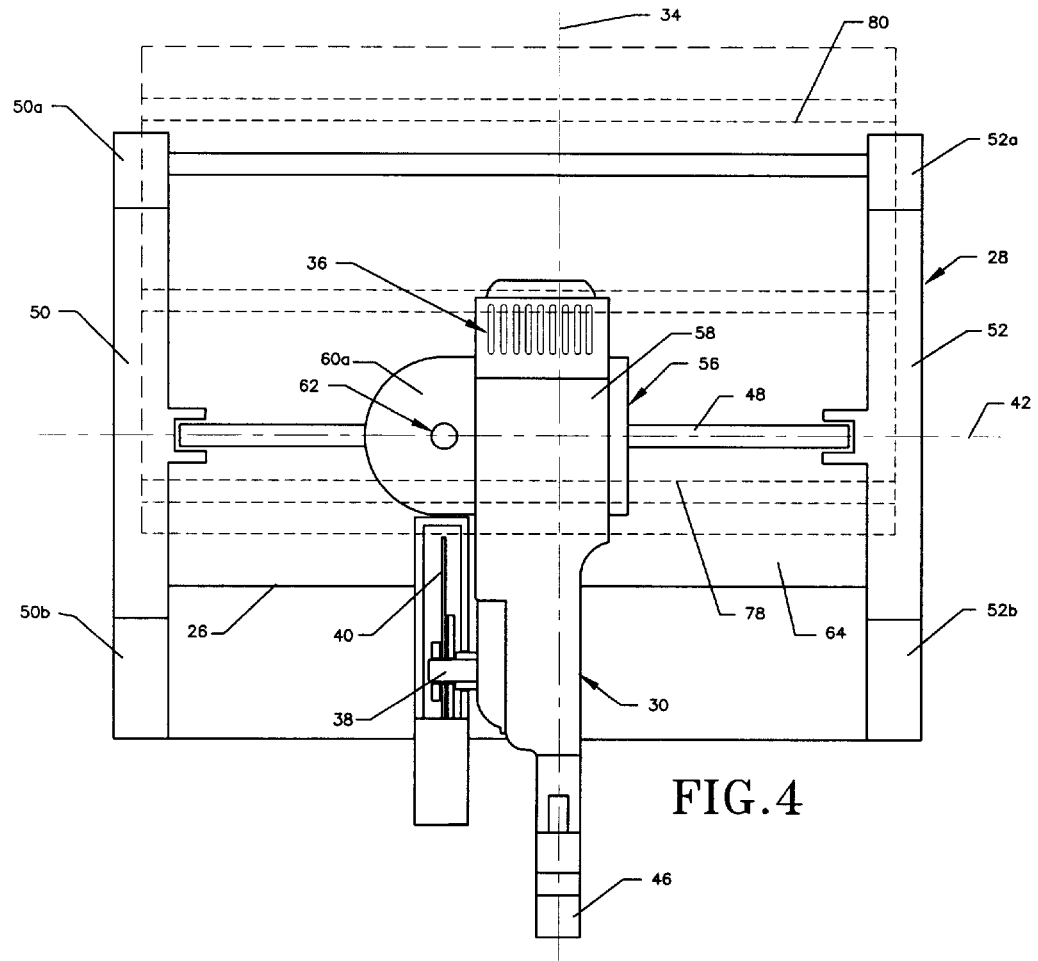
FIG. 4 is a top plan view of a power coping machine with the tabletop shown in phantom lines.

Referring to FIG. 4, the cutting tool 30 has a longitudinal axis 34 normally extending generally transversely of the forward edge 26 of the molding support surface 22. The cutting tool 30 comprises an electric motor 36 having a shaft 38 normally extending generally parallel to the forward edge 26 for mounting a circular cutting blade 40 on the shaft 38 and normally driving the blade 40 with the motor 36 in a plane generally perpendicular to the forward edge 26. As will be appreciated from FIGS. 4 and 8, the circular cutting blade 40 has a circumferential cutting edge 40a disposed in proximity to the forward edge 26 of the molding support surface 22.

Referring now to FIGS. 1–4, the cutting tool support means 32 will be seen to be disposed in spaced relation to the forward edge 26 of the molding support surface 22 for supporting the cutting tool 30 in a manner permitting at least two degrees of controlled manual movement of the cutting tool 30. The cutting tool support means 32 accommodates axial movement of the circular cutting blade 40 relative to the molding support surface 22 along an axis 42 in FIG. 4 normally extending generally perpendicular to the longitudinal axis 34 of the cutting tool 30 in a direction generally parallel to but spaced from the forward edge 26 of the molding support surface 22. The cutting tool support means 32 also accommodates radial movement of the circular cutting blade 40 relative to the molding support surface 22 along a radius parallel to the longitudinal axis 34 of the cutting tool 30 in a direction generally perpendicular to and toward and away from the forward edge 26 of the molding support surface 22. Preferably, the cutting tool support means 32 permits three degrees of controlled manual movement thereby accommodating pivoting movement of the circular cutting blade 40 about an axis 44 (see FIG. 1) to position the circular cutting blade 40 at an acute angle (see FIG. 5) or obtuse angle (see FIG. 6) relative to the forward edge 26 of the molding support surface 22.

From the foregoing, it will be appreciated that the circumferential cutting edge 40a of the circular cutting blade 40 can be moved in an axial direction along the axis 42, can be moved radially relative to the axial direction by pivoting the longitudinal axis 34 relative to the axis 42, and can be pivoted about the axis 44 to change the angular orientation in order to provide maximum flexibility in coping the end 24a of the piece of molding 24.

As shown in FIGS. 1–4, the cutting tool support means 32 includes a linear bearing assembly operatively associated with the cutting tool 30 and the frame 28 for accommodating movement of the cutting tool 30 generally parallel and perpendicular to the forward edge 26 of the molding support surface 22. Additionally, the power coping machine 20 includes handle means 46 operatively associated with the cutting tool 30 at a point remote from the cutting tool support means 32 for manually controlling movement of the cutting tool 30 relative to the forward edge 26 of the molding support surface 22.

Figure 7:
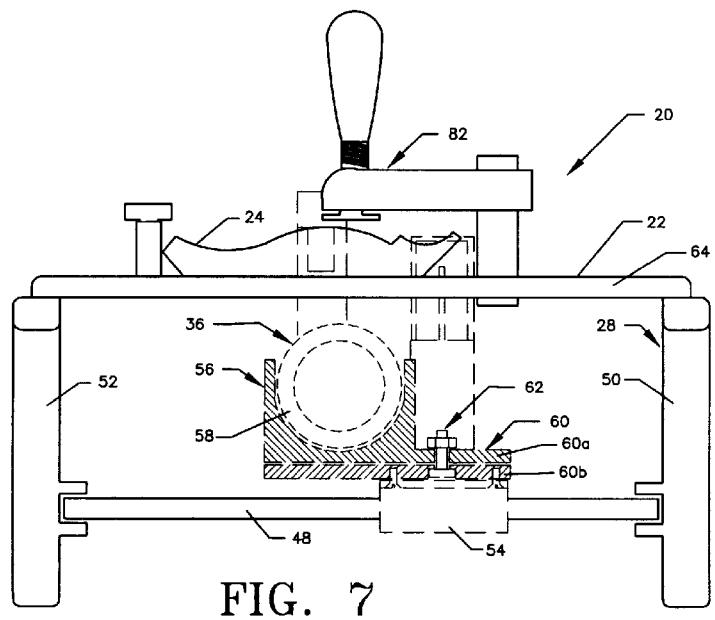
FIG. 7 is i front elevational view of a power coping machine with the electric motor and pivotal support assembly shown in phantom lines.

More specifically, the linear bearing assembly includes a rod 48 spanning the distance between and being integrally associated with legs 50 and 52 of the frame 28 for the machine 20 at a point generally parallel to and spaced below the forward edge 26 of the molding support surface 22. Furthermore, the linear bearing assembly includes a linear bearing 54 which is spaced below the cutting tool 30 and integrally associated with the cutting tool 30 by means of a mounting yoke generally designated 56 which is joined to a housing 58 for the electric motor 36. As shown, the mounting yoke 56 is joined to the housing 58 at an end of the cutting tool 30 generally opposite the handle means 46 and remote from the circular cutting blade 40, and the mounting yoke 56 lies generally along and on opposite sides of the longitudinal axis 34 for the cutting tool 30 (see, also, FIG. 7).

Figure 3:
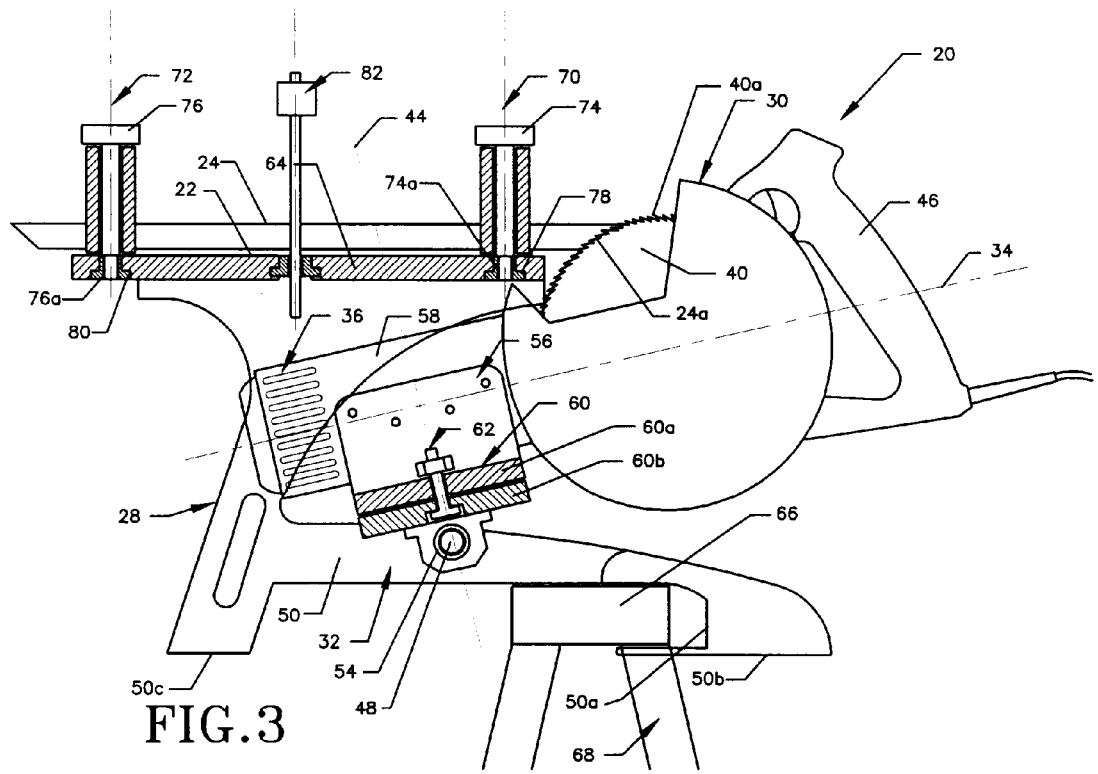
FIG. 3 is a left side elevational view similar to FIG. 1 showing a piece of molding being, coped.

Referring specifically to FIGS. 1, 3 and 4, the cutting tool support means 32 further includes means for adjusting the angle of the longitudinal axis 34 of the cutting tool 30 relative to the forward edge 26 of the molding support surface 22 such that the circular cutting blade 40 can be driven at an acute angle (see FIG. 5) or an obtuse angle (see FIG. 6) thereto. As will be seen, the angle adjusting means comprises a pivotal support assembly generally designated 60 including a first plate 60a operatively associated with the cutting tool 30 and a second plate 60b operatively associated with the linear bearing assembly 54 together with a fastener generally designated 62 for releasably securing the first and second plate 60a and 60b in a selected position of angular adjustment about the fastener 62.

As shown in FIGS. 1–4, the molding support surface 22 is preferably defined by a generally planar tabletop 64 and the frame 28 is preferably defined by at least the pair of legs 50 and 52 which are integrally associated with the tabletop 64 so as to stably support the tabletop in spaced relation to a machine supporting surface. It will be appreciated in this connection that the machine supporting surface can advantageously take the form of the top cross-member 66 of a saw horse 68 in which case the legs 50 and 52 may be formed to have generally U-shaped recesses 50a and 52a so as to receive the cross-member 66 of the saw horse 68 therein. In this manner, the tabletop 64 can be supported by the legs 50 and 52 in a generally horizontal plane vertically spaced from the machine supporting surface 66 and the forward edge 26 of the tabletop 64 can advantageously comprise a linear edge which is suitably spaced above the machine supporting surface 66 and the cutting tool 30.

While described in connection with support by a saw horse 68, it will also be appreciated that the legs 50 and 52 are formed so as to have feet as at 50b, 50c and 52b, 52c. This permits the power coping machine 50 to be placed on a tabletop or on a floor or on any other generally horizontal surface upon which it is wished to support the power coping machine 20. Obviously, the exact form of the legs 50 and 52, and the exact form of the feet 50b, 50c and 52b, 52c can be varied while still accomplishing the function that has been described herein.

As for other details, the power coping machine may include stops such as 70 and 72 against which the molding 24 can be abutted for stably coping the end 24a thereof. The stops 70 and 72 may, by way of example, include threaded fasteners 74 and 76, respectively, that have ends 74a and 76a that are confined within slots 78 and 80 for sliding movement. In this manner, the stops 70 and 72 may be laterally adjusted parallel to the forward edge 26 of the tabletop 64 and secured in a selected position by means of the threaded fasteners 74 and 76.

Also as shown, the power coping machine 20 may include a suitable clamp generally designated 82 for tightly securing the molding 24 in a selected position so that it need not be held when manipulating the handle means 46 to cause the cutting tool 30 to cope the end 24a of a piece of molding 24.

In coping the end of a piece of molding, the handle means 46 can be utilized to impart radial movement to control the depth of cutting into the end. It will also be appreciated that the handle means 46 can be utilized to manually control movement generally parallel to the end of the piece of molding so as to work across the end to control the contour being formed therein. In this manner, the power coping machine 20 can very precisely form a desired contour permitting the formation of a well-fitting joint.

Figure 5:
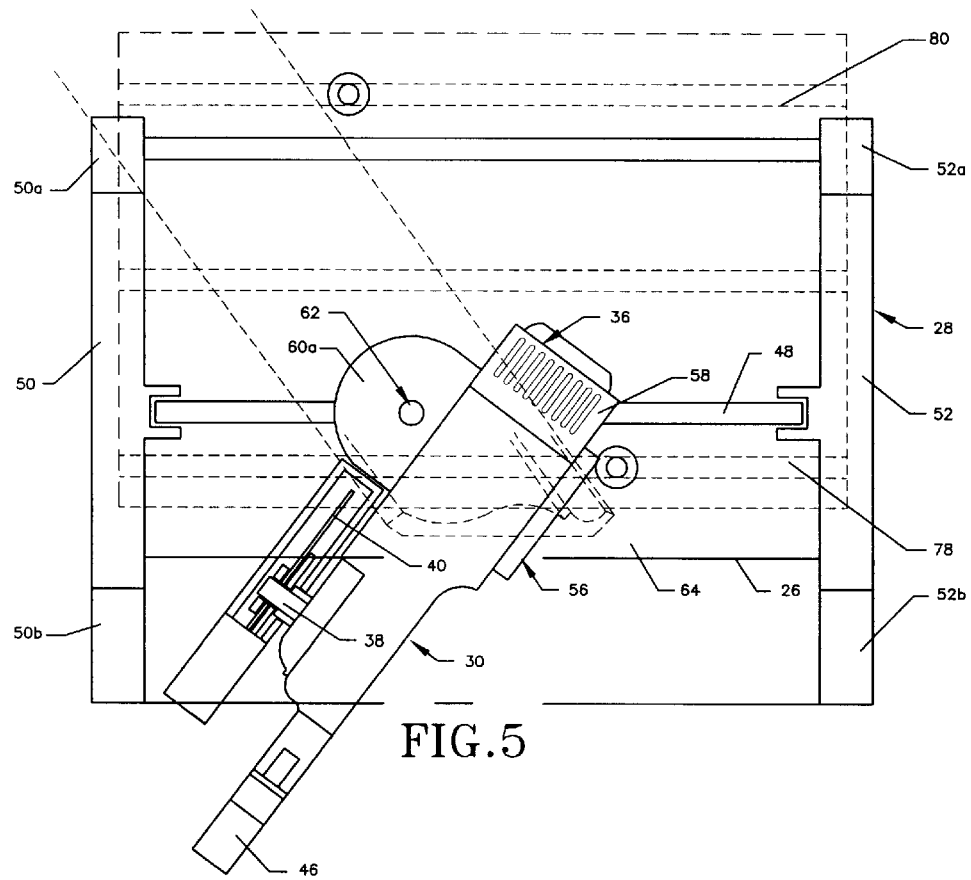
FIG. 5 is a bottom plan view similar to FIG. 4 showing the cutting tool positioned so as to be at an acute angle.
Figure 6:
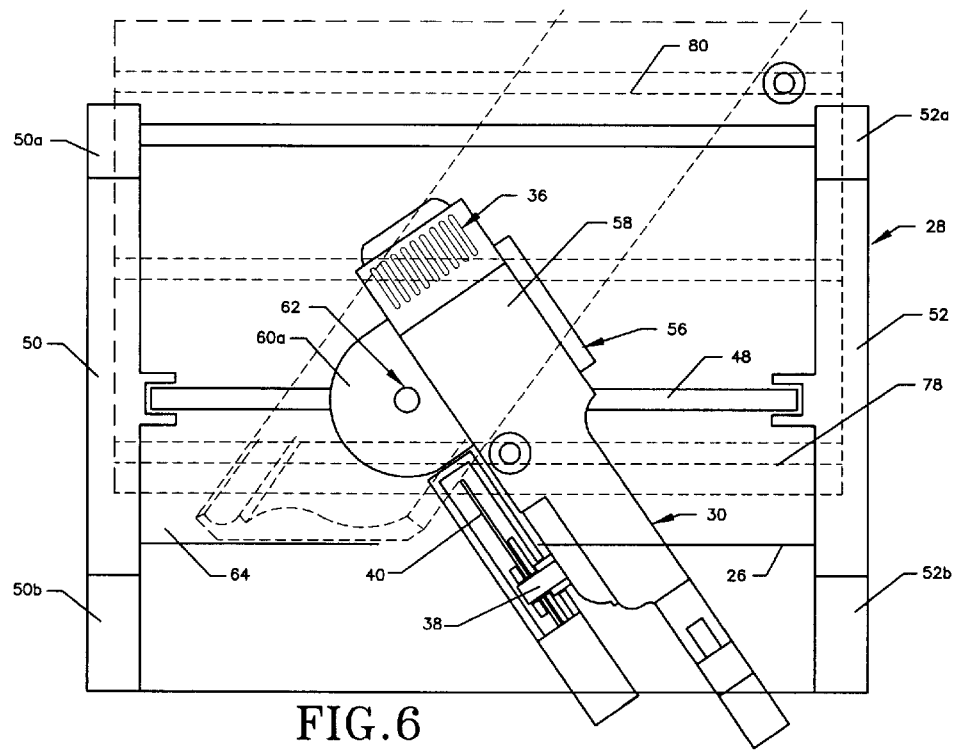
FIG. 6 is a bottom plan view similar to FIG. 4 showing the cutting tool positioned so as to be at an obtuse angle.
Figure 10:
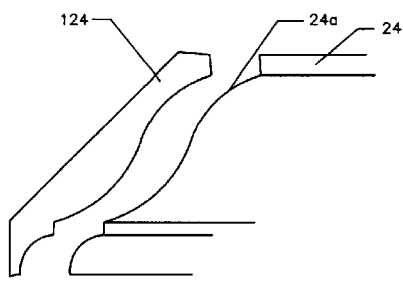
FIG. 10 is an elevational view of two pieces of a crown molding to be joined at a substantially right angle.
Figure 11:
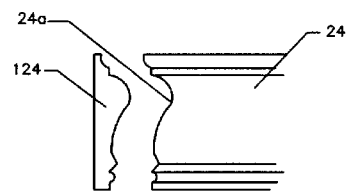
FIG. 11 is an elevational view of two pieces of a chair rail molding to be joined at a substantially right angle.
Figure 12:
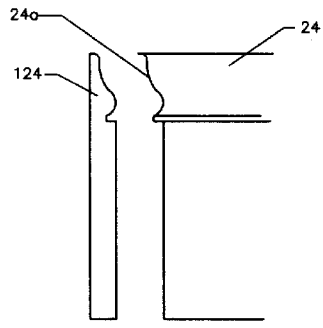
FIG. 12 is an elevational view of two pieces of a base molding to be joined at a substantially right angle.
Figure 9:
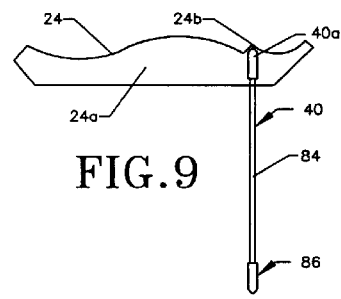
FIG. 9 is a schematic view showing additional details of a cutting blade as it copes the end of a piece of molding.

More specifically, it will be appreciated that examples of such joints have been shown in FIGS. 10–12 wherein the piece of crown molding 24 has the end 24a coped to fit the piece of crown molding 124 (FIG. 10), the piece of chair rail molding 24' has the end 24a' coped to fit the piece of chair rail molding 124' (FIG. 11), and the piece of base molding 24" has the end 24a" coped to fit the piece of base molding 124". Moreover, it will also be seen from FIG. 9 exactly, how the circumferential cutting edge 40a of the circular cutting blade 40 meets the end 24a of the piece of crown molding 24 and, if a lesser or deeper undercut is desired, this can be achieved by changing the angle of the cutting tool 30 relative to the forward edge of the generally planar tabletop 64 to an acute or obtuse angle as shown in FIGS. 5 and 6.

Figure 8:
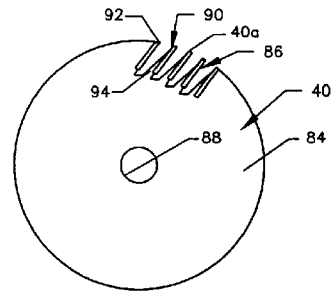
FIG. 8 is a side elevational view of a cutting blade for use with the power coping machine of the present invention.

Referring once again to FIGS. 8, 9, and 9A another aspect of the present invention includes the unique power tool cutting blade 40 previously described which has a circular body member 84 and a circumferential cutting region 86 on an outer periphery of the circular body member 84. It will be appreciated in this connection that the circumferential cutting region 86 has been shown only about a small portion of the circumferential cutting edge 40a of the cutting blade 40 although, in actual practice, the circumferential cutting region 86 will extend completely thereabout. As shown in FIG. 8, the circular body member 84 has a central aperture 88 therein of a diameter to receive a driven shaft such as the shaft 38 (see FIG. 4).

Figure 9A:
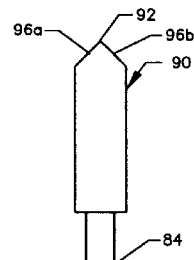
FIG. 9A is an enlarged detailed view of a tooth of the cutting blade for coping the end of a piece of molding.

Referring specifically to FIG. 8, the circumferential cutting region 86 has a plurality of circumferentially spaced teeth 90 disposed about the outer periphery of the circular body member 84. The teeth 90 each include a cutting tip 92 Formed so as to have a generally V-shaped profile wherein each of the teeth 90 is formed of carbide integrally associated with one of a plurality of regularly spaced and outwardly projecting fingers 94 on the circular body member 84 (see FIG. 8) which serve to define the circumferential cutting region 86. As best shown in FIG. 9A, the teeth are each formed to have a generally rectangular-shaped profile with the cutting tip 92 being formed on a radially outermost extent thereof.

Still referring to FIG. 9A, the cutting tips 92 each are defined by a pair of cutting surfaces 96a and 96b each of which is disposed at an acute angle to a plane defined by the circular body member 84. It will be appreciated in this respect from FIGS. 8 and 9, in particular, that the circular body member 84 is a flat metal disk on which the fingers 94 are integrally formed about the circumference thereof. By forming the teeth 90 to have a generally V-shaped profile, it is possible to make a very precise coped end 24a even in difficult areas including the crotches such as 24b in the molding 24 (see FIG. 9).

While in the foregoing there has been set forth a preferred embodiment of the invention, it will be appreciated that the details herein given may be varied by those skilled in the art without departing from the true spirit and scope of the appended claims.

I claim:

1. A power coping machine, comprising:

a molding support surface for stably supporting a piece of molding to be coped with said machine, said molding support surface having a forward edge over which an end of said piece of molding can be made to extend for coping said end thereof, said molding support surface being integrally associated with a frame for said machine;

a cutting tool having a longitudinal axis extending generally transversely of said forward edge of said molding support surface, said cutting tool comprising an electric motor having a shaft extending generally parallel to said forward edge for mounting a circular cutting blade on said shaft and driving said blade with said motor in a plane generally perpendicular to said forward edge, said circular cutting blade having a circumferential cutting edge disposed in proximity to said forward edge of said molding support surface;

cutting tool support means in spaced relation to said forward edge of said molding support surface for supporting said cutting tool for controlled movement, said cutting tool support means accommodating movement of said cutting tool in a direction generally parallel to said forward edge thereof, and accommodating movement of said cutting tool in a direction generally perpendicular to said forward edge thereof;

said cutting tool support means supporting said cutting tool such that said forward edge of said molding support surface is spaced above said cutting tool:

whereby said circumferential cutting edge of said circular cutting blade can be moved toward and away from said forward edge to cope said end of said piece of molding.

2. The power coping machine of claim 1 wherein said molding support surface is defined by a generally planar table top, said frame being defined by at least a pair of legs integrally associated with said table top, said legs supporting said table top in spaced relation to a machine supporting surface.

3. The power coping machine of claim 1 wherein said molding support surface is disposed in a generally horizontal plane in vertically spaced relation to a machine supporting surface and said forward edge of said molding support surface comprises a linear edge spaced above said cutting tool.

4. The power coping machine of claim 1 wherein said cutting tool support means includes a linear bearing assembly operatively associated with said cutting tool and said frame accommodating movement generally parallel and perpendicular to said forward edge of said molding support surface.

5. The power coping machine of claim 1 including handle means operatively associated with said cutting tool at a point remote from said cutting tool support means for manually controlling movement of said cutting tool relative to said forward edge of said molding support surface.

6. The power coping machine of claim 1 wherein said cutting tool support means further includes means for adjusting the angle of said longitudinal axis of said cutting tool relative to said forward edge of said molding support surface such that said circular cutting blade is driven at an acute or obtuse angle thereto.

7. A power coping machine, comprising:

a molding support surface for stably supporting a piece of molding to be coped with said machine, said molding support surface having a forward edge over which an end of said piece of molding can be made to extend for coping said end thereof, said molding support surface being integrally associated with a frame for said machine;

a cutting tool having a longitudinal axis normally extending generally transversely of said forward edge of said molding support surface, said cutting tool comprising an electric motor having a shaft normally extending generally parallel to said forward edge for mounting a circular cutting blade on said shaft and normally driving said blade with said motor in a plane generally perpendicular to said forward edge, said circular cutting blade having a circumferential cutting edge disposed in proximity to said forward edge of said molding support surface;

cutting tool support means in spaced relation to said forward edge of said molding support surface for supporting said cutting tool in a manner permitting at least two degrees of controlled manual movement of said cutting tool, said cutting tool support means accommodating axial movement of said cutting tool along an axis normally extending generally perpendicular to said longitudinal axis of said cutting tool in a direction generally parallel to but spaced from said forward edge of said molding support surface, and accommodating radial movement of said cutting tool along a radius coinciding with said longitudinal axis of said cutting tool in a direction generally perpendicular to and toward and away from said forward edge of said molding support surface;

said cutting tool support means supporting said cutting tool such that said forward edge of said molding support surface is spaced above said cutting tool;

whereby said circumferential cutting edge of said circular cutting blade can be moved at least in an axial direction and radially relative to said axial direction toward and away from said forward edge to cope said end of said piece of molding.

8. The power coping machine of claim 7 wherein said molding support surface is defined by a generally planar table top, said frame being defined by at least a pair of legs integrally associated with said table top, said legs supporting said table top in spaced relation to a machine supporting surface.

9. The power coping machine of claim 7 wherein said generally planar table top is disposed in a generally horizontal plane in vertically spaced relation to a machine supporting surface and said forward edge of said generally planar table top comprises a linear edge spaced above said cutting tool.

10. The power coping machine of claim 7 wherein said cutting tool support means includes a linear bearing assembly operatively associated with said cutting tool and said frame accommodating movement generally parallel and perpendicular to said forward edge of said molding support surface.

11. The power coping machine of claim 7 including handle means operatively associated with said cutting tool at a point remote from said cutting tool support means for manually controlling movement of said cutting tool relative to said forward edge of said molding support surface.

12. The power coping machine of claim 1 wherein said cutting tool support means further includes means for adjusting the angle of said longitudinal axis of said cutting tool relative to said forward edge of said molding support surface such that said circular cutting blade is driven at an acute or obtuse angle thereto.

13. A power coping machine, comprising:
a molding support surface for stably supporting a piece of molding to be coped with said machine, said molding support surface having a forward edge over which an end of said piece of molding can be made to extend for coping said end thereof, said molding support surface being integrally associated with a frame for said machine;
a cutting tool having a longitudinal axis normally extending generally transversely of said forward edge of said molding support surface, said cutting tool comprising an electric motor having a shaft normally extending generally parallel to said forward edge for mounting a circular cutting blade on said shaft and normally driving said blade with said motor in a plane generally perpendicular to said forward edge, said circular cutting blade having a circumferential cutting edge disposed in proximity to said forward edge of said molding support surface;
cutting tool support means in spaced relation to said forward edge of said molding support surface for supporting said cutting tool in a manner permitting three degrees of controlled manual movement of said cutting tool, said cutting tool support means accommodating axial movement of said circular cutting blade relative to said molding support surface along an axis normally extending generally perpendicular to said longitudinal axis of said cutting tool in a direction generally parallel to but spaced from said forward edge of said molding support surface, and accommodating radial movement of said circular cutting blade relative to said molding support surface along a radius coinciding with said longitudinal axis of said cutting tool in a direction generally perpendicular to and toward and away from said forward edge of said molding support surface, said cutting tool support means also accommodating pivoting movement of said circular cutting blade to position said circular cutting blade at an acute or obtuse angle relative to said forward edge of said molding support surface;
said cutting tool support means supporting said cutting tool such that said forward edge of said molding support surface is spaced above said cutting tool; whereby said circumferential cutting edge of said circular cutting blade can be moved in an axial direction, moved radially relative to said axial direction, and pivoted to change the angular orientation, in order to cope said end of said piece of molding.

14. The power coping machine of claim 13 wherein said cutting tool support means includes a linear bearing assembly operatively associated with said cutting tool and said frame for accommodating movement of said cutting tool, said linear bearing assembly accommodating movement generally parallel and perpendicular to said forward edge of said molding support surface, and including handle means operatively associated with said cutting tool at a point remote from said cutting tool support means for manually controlling movement of said cutting tool relative to said forward edge of said molding support surface.

15. The power coping machine of claim 14 wherein said cutting tool support means further includes means for adjusting the angle of said longitudinal axis of said cutting tool relative to said forward edge of said molding support surface such that said circular cutting blade can be driven at an acute or obtuse angle thereto, said angle adjusting means comprising a pivotal support assembly including a first plate operatively associated with said cutting tool and a second plate operatively associated with said linear bearing assembly together with a fastener for releasably securing said first and second plates in a selected position of angular adjustment about said fastener.

16. The power coping machine of claim 15 wherein said molding support surface is defined by a generally planar table top and said frame is defined by at least a pair of legs integrally associated with said table top so as to support said table top in spaced relation to a machine supporting surface, said generally planar table top being supported by said legs in a generally horizontal plane in vertically spaced relation to a machine supporting surface and said forward edge of said generally planar table top comprising a linear edge spaced above said machine supporting surface and also spaced above said cutting tool.

17. The power coping machine of claim 14 wherein said linear bearing assembly includes a rod spanning the distance between and being integrally associated with said legs of said frame for said machine at a point generally parallel to and spaced below said forward edge of said molding support surface, and a linear bearing spaced below said cutting tool and being integrally associated with said cutting tool generally opposite said handle means and remote from said circular cutting blade and lying along said longitudinal axis for said cutting tool.

* * * * *